United States Patent [19]
Spowage et al.

[11] Patent Number: 5,466,736
[45] Date of Patent: Nov. 14, 1995

[54] ELECTROSTATIC SPRAY PAINT

[75] Inventors: Mark J. Spowage, Leeds; Julia P. Grayson, Sheffield; Alan C. Outhwaite, Wakefield; Nighat Ahmed, Bristol, all of United Kingdom

[73] Assignee: The Morgan Crucible Company PLC, Windsor, England

[21] Appl. No.: 211,643

[22] PCT Filed: Oct. 9, 1992

[86] PCT No.: PCT/GB92/01839

§ 371 Date: Jun. 16, 1994

§ 102(e) Date: Jun. 16, 1994

[87] PCT Pub. No.: WO93/07226

PCT Pub. Date: Apr. 15, 1993

[30] Foreign Application Priority Data

Oct. 9, 1991 [GB] United Kingdom .................. 9121411

[51] Int. Cl.⁶ .................. B32B 9/04; C09D 101/18; C09D 175/04; C09D 167/08; C09D 133/10; C09D 133/08
[52] U.S. Cl. .................. 524/315; 106/189; 106/195; 427/415; 427/421; 427/469; 427/485; 427/486; 524/361; 524/363; 524/376; 524/389; 524/391
[58] Field of Search .................. 524/35, 361, 376, 524/363, 315, 389, 391; 427/469, 485, 486, 421, 415; 106/189, 195

[56] References Cited

U.S. PATENT DOCUMENTS

| | | | |
|---|---|---|---|
| 3,267,057 | 8/1966 | Spiller | 523/459 |
| 3,348,965 | 10/1967 | Drum | 427/485 |
| 3,796,590 | 3/1974 | Spiller | 427/483 |
| 4,151,152 | 4/1979 | Schmitt et al. | 528/45 |
| 4,276,212 | 6/1981 | Khanna et al. | 525/162 |
| 4,638,031 | 1/1987 | Bouboulis | 524/773 |
| 4,739,006 | 4/1988 | Bouboulis | 524/773 |
| 4,752,502 | 6/1988 | Winchester | 427/421 |

FOREIGN PATENT DOCUMENTS

| | | |
|---|---|---|
| 0019359 | 11/1980 | European Pat. Off. . |
| 0027719 | 4/1981 | European Pat. Off. . |
| 0029339 | 5/1981 | European Pat. Off. . |
| 0029683 | 6/1981 | European Pat. Off. . |
| 0029594 | 6/1981 | European Pat. Off. . |
| 0119384 | 1/1984 | European Pat. Off. . |
| 0148581 | 7/1985 | European Pat. Off. . |
| 1519258 | 1/1970 | Germany . |
| 2018627 | 10/1979 | United Kingdom . |
| 1569707 | 6/1980 | United Kingdom . |

*Primary Examiner*—Veronica P. Hoke
*Attorney, Agent, or Firm*—Larson and Taylor

[57] ABSTRACT

Electrostatic spray paint formulations of alkyds, acrylics, nitrocellulose or polyurethanes having defined viscosity values and film forming solids content.

20 Claims, 1 Drawing Sheet

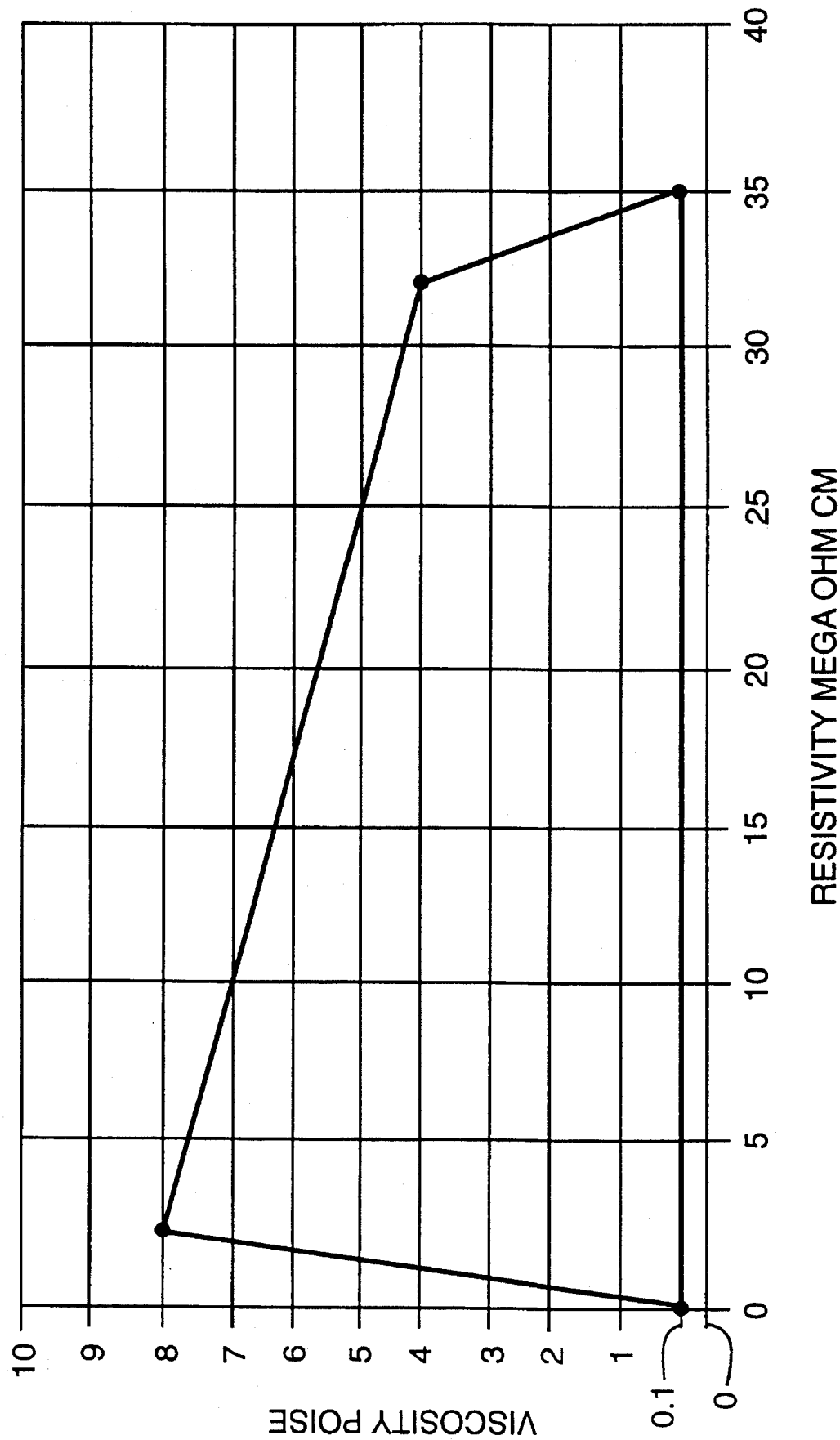

ELECTROSTATIC SPRAY PAINT

FIELD OF THE INVENTION

The invention relates to spray paints, for use in particular in electrostatic spraying.

BACKGROUND

Electrostatic spray heads are described in ICI's U.K. patent specifications Nos. 1 569 707, 2 018 601 and numerous others. Liquid supplied to the head is broken up essentially by the action of a high voltage field to form charged droplets, which are then attracted to and deposit on an earthed target such as a plant crop. The current passing, which is minute and harmless, is supplied for example by dry cells. No impellant gas or mechanical action is involved in transport of the spray.

Spraying of paint is mentioned in the above patents, but without discussion of paint compositions or other aspects of successful application of the electrostatic principle to paint.

DEVELOPMENT OF THE INVENTION

We have sought to apply electrostatic spray generation to paint and other associated products where normally they have been applied using aerosol dispensing systems. We have found that by using the electrostatic system, material can be applied more efficiently with a greater degree of control and accuracy and generate a surface finish comparable to that given by an aerosol.

Further, especially as the use of a propellant is not required, a considerable reduction in emissions of solvents and other volatile constituents is achieved when compared to an aerosol spray system.

The inherent advantages of electrostatic paint spraying over aerosol paint spraying can be defined thus:

i) Directional, targeted spraying with reduced drift and over spray of adjacent areas.

ii) Considerable reduction in emissions of volatile constituents when compared to a typical aerosol spray paint. This is because no propellant is required to generate the spray and the paint itself requires a lower proportion of solvent in use, and also because of the inherent transfer efficiency of the system.

Typically an automotive spray paint aerosol may contain 22% propellant, 70% solvent, and 8% paint solids compared to the present formulations that contain no propellant and at least double that solids content. Calculations have demonstrated that if used for a similar application, then the system detailed can reduce emissions of volatile organic compounds (VOC's) by up to three quarters when compared to those emitted during application of a paint via an aerosol.

In order to achieve satisfactory results attention will be paid to characteristics of the paint, such as viscosity, resistivity, solids content and drying time, and the operating characteristics of the spray gun, such as voltage and flow rate. However we have found that the viscosity and resistivity of the paint formulation are key points.

In the context of the present invention, paint formulations consist essentially of pigment, resin, and solvent. The pigment, resin and other non-volatile elements together are the solids of the final paint coat, the pigment giving colour and the resin, which may for example be a nitrocellulose, alkyd, polyurethane, or acrylic, acting to bind the system, promoting adhesion, gloss, flexibility and wear resistance of the film.

The solvent is largely or wholly lost by evaporation from the deposited coat (in some systems part becomes incorporated in the resin), but is essential to formation of the spray and its deposition as a paint coat.

In the spraying, the paint must of course be thin enough to form a spray and not merely dust on the work but equally not so thin that it forms runs and sags. However there are special requirements in electrostatic spraying. Ideally the paint fed to the head is broken up, by the electrostatic forces in the head, into a diverging spray that is uniform and of close particle size distribution, and thus the resistivity and viscosity of the paint formulation have to be considered in relation to the generation and transport of the spray.

Specifically, the following observations have been made in the development of the formulation.

i) Rheology

If viscosity is too low, sags form in the paint film on the work. If it is too high then no proper spray cloud forms and spidery filaments of paint are left between droplets on the surface; alternatively a spray cloud may be formed but it is poorly dispersed with long ligaments and is excessively divergent.

ii) Resistivity

If resistivity is too low the spray cloud may be over-divergent, or a fine mist mixed with coarse droplets may be observed. If the resistivity is too high then the spray cloud may not be divergent enough, or long ligaments with relatively large particles of paint in a low-divergence cloud may be observed.

THE INVENTION

The invention lies primarily in paint compositions formulated to provide satisfactory finishes in electrostatic spraying, understood as a spraying process in which the spray is generated by forces which are primarily electrostatic (they may be referred to as electrohydrodynamic forces), rather than by mechanical means or the action of a vaporisable propellant, and the spray particles are attracted to the work by virtue of resulting charges on the particles.

So stated the invention provides a spray paint formulation of film-forming solids content by weight, according to the resin system, of

| | |
|---|---|
| alkyds | 55% to 75% or higher, 85% up to 90% |
| acrylics | 20 or 25% to 35 or 40% |
| nitrocellulose | 17.5% to 22.5 or 25% |
| polyurethanes | 50% to 60 or 70% | and viscosity/resistivity values which in a rectangular plot of viscosity (P) and resistivity (ohm cm) fall within the rectilinear-sided operating envelope defined by the points x/y $0.25\times10^6/0.1$, $2\times10^6/8$, $32\times10^6/4$ and $35\times10^6/0.1$; or more conveniently $0.25\times10^6/0.25$, $2\times10^6/8$, $32\times10^6/4$ and $35\times10^6/0.25$.

The invention may however also be stated as characterised both by the paint formulation above and the novel technical effect of suitability for successful application in electrostatic spraying, for example at from 1 up to 10 or 15 ml/min, conveniently 1 to 6 ml/min, with resulting gloss of over 70, preferably over 80, as defined by ASTM D523,60°. Application rates may be 1.5 to 10 $g/s/cm^2\times10^{-5}$ dry paint film, preferably 1.7 to 8.4 $g/s/cm^2\times10^{-5}$.

In other terms again, the invention can be stated as a method of spray painting in which electrostatic spraying as defined is employed and the paint formulation is as set out.

The solids content of the formulation is defined as what forms the paint film, whether or not in solid form in the formulation.

EXAMPLES

The invention is illustrated in the tables of examples wherein:

Table 1 gives a number of formulations of illustrative compositions, the paint system being regarded as based on the resin named with the composition code.

Table 2 lists the materials used in the formulations, acknowledging trade marks and giving the function of the materials.

Table 3 gives the solids content of the formulations, taking account of materials that as supplied contain volatiles, with their resistivity and viscosity and the gloss and covering power at different sprayrates.

BRIEF DESCRIPTION OF THE DRAWING

Table 4 (FIG. 1) is a graph of the relations expressed in the statement of invention above.

In formulating the paint compositions there are no special problems, the components simply being brought together and blended until the pigments are uniformly dispersed. The functions of the components are as given broadly in Table 2, and are generally well known in themselves. In the nitrocellulose mix however it may be noted that the "Synolac" is a plasticising alkyd giving durability and flexibility. Similarly the small quantity of nitrocellulose resin in one of the acrylic formulations is to harden the paint film and improve its resistance to solvent attack.

In the compositions further, the solvent properties are primarily as follows, though it will be appreciated that some synergy exists between components in the system:

a) Butanol—provides secondary solvency and prevents damp coalescence b) Methyl ethyl ketone—Assists set up of paint through fast evaporation c) Xylene and toluene—Dilute and assist in solvating the alkyd resin d) Butyl acetate—Balance solvent and flow and resistivity modifier e) Diacetone alcohol—Slow evaporating solvent that prevents blush and chilling of paint film; resistivity modifier f) Acetone—Fast evaporating solvent; viscosity and resistivity modifier g) Ethylene glycol monobutylether and ethyl 3-ethoxy propionate—Slow drying solvents aiding film forming characteristics and improving the surface finish of the paint film In evaluating the formulation spraying was through an electrostatic spray head of the kind described in ICI's patents. Spraying distances between gun and test panels were approximately 6 inches (15 cm). Covering power was evaluated by spraying at various rates as indicated to give a visibly acceptable film and weighing the panels after 16 hours drying under ambient conditions.

TABLE 1

| Paint systems, % w/w | Nitrocellulose AP10/M/96 | Nitrocellulose AP10/M/1/44 |
|---|---|---|
| Nitrocellulose DHX 30-50 | 11.76 | 8.06 |
| Synolac 9285X | 19.23 | 15.40 |
| Acetone | 10.00 | 6.62 |
| Diacetone Alcohol | 5.00 | 18.80 |
| Butyl Acetate | 12.81 | 12.46 |
| Xylene | 13.97 | 11.59 |
| Toluene | 8.38 | 6.96 |
| Methyl Ethyl Ketone | 4.66 | 3.87 |
| Butyl Alcohol | 9.31 | 7.73 |
| Carbon Black | 2.85 | — |
| Tryl Red | — | 2.88 |
| Quinacridone Pink | — | 3.87 |
| Perenol F40 | — | 0.69 |
| Dibutyl Phthalate | 1.58 | 0.71 |
| Byk P104S | 0.45 | 0.36 |
| | 100.00 | 100.00 |

| | Polyurethane AP10/M/97 | Polyurethane AP10/J/26 |
|---|---|---|
| Unithane 638W | 59.55 | 52.80 |
| Acetone | 6.80 | 10.00 |
| Diacetone Alcohol | 5.40 | — |
| Butyl Acetate | 0.90 | — |
| Xylene | — | 12.02 |
| Titanium Dioxide | 24.82 | 22.00 |
| Zirconium Drier | 0.45 | 0.40 |
| Manosec Cobalt | 0.14 | 0.12 |
| Manosec Calcium | 0.46 | 0.41 |
| Byk ES80 | — | 2.00 |
| Catafor CA80 | 1.20 | — |
| Nuosperse 657 | 0.10 | 0.09 |
| Methyl Ethyl Ketoxime | 0.18 | 0.16 |
| | 100.00 | 100.00 |

| | Acrylic AP10/J/5 | Acrylic AP/10/M/99 |
|---|---|---|
| Nitrocellulose DHX 30-50 | 3.79 | — |
| Neocryl B722 | — | 12.98 |
| Neocryl B735 | 14.80 | 8.65 |
| Paraloid B48N | — | 4.32 |
| Acetone | 10.00 | 4.00 |
| Diacetone Alcohol | — | 10.00 |
| Ethylene Glycol Monobutyl Ether | — | 11.56 |
| Butyl Acetate | 14.38 | 2.30 |
| Xylene | 22.84 | 28.85 |
| Toluene | 8.10 | 5.28 |
| Ethyl 3-ethoxy Propionate | — | 4.16 |
| Methyl Ethyl Ketone | 4.50 | — |
| Butyl Alcohol | 9.00 | — |
| Titanium Dioxide | 8.43 | 5.36 |
| Microlith Blue | — | 0.84 |
| Byk ES80 | — | 1.20 |
| Perenol F40 | — | 0.50 |
| Dibutyl Phthalate | 3.57 | — |
| Byk P104S | 0.59 | — |
| | 100.00 | 100.00 |

| | Alkyd AP10/N/70A | Alkyd AP10/K/12i |
|---|---|---|
| Plastyrol AC251 | 56.44 | — |
| Wresinol VAS9142 | — | 63.12 |
| Acetone | 1.98 | 4.00 |
| Diacetone Alcohol | 4.95 | 13.00 |
| Butyl Acetate | — | 3.00 |
| Toluene | — | 5.00 |
| Titanium Dioxide | 30.69 | 9.14 |
| Zirconium Drier | 0.30 | 0.20 |
| Manosec Cobalt | 0.50 | 0.24 |
| Manosec Calcium | 0.99 | 1.18 |
| Byk ES80 | 2.77 | — |

TABLE 1-continued

| Paint systems, % w/w | | |
|---|---|---|
| Catafor CA80 | 1.09 | 0.50 |
| Bentone SD-2 | 0.20 | 0.15 |
| Nuosperse 657 | — | 0.24 |
| Methyl Ethyl Ketoxime | 0.10 | 0.24 |
| | 100.00 | 100.00 |

| | Acrylic AP10/LV/2 | Alkyd AP10/HS/4 |
|---|---|---|
| Nitrocellulose DHX 30-50 | 2.50 | — |
| Elvacite 2013 | 12.67 | — |
| Soalkyd 3007 | — | 47.60 |
| Acetone | 30.00 | 5.00 |
| Butyl Acetate | 9.82 | 7.00 |
| Xylene | 18.80 | — |
| Toluene | 6.42 | — |
| Methyl Ethyl Ketone | 3.57 | — |
| Butyl Alcohol | 7.14 | — |
| Titanium Dioxide | 0.38 | 34.28 |
| Carbon Black | 1.10 | — |
| Magnacryl PX 1264 | 3.38 | — |
| Magnacryl PX 1275 | 0.28 | — |
| Zirconium Drier | — | 0.60 |
| Manosec Cobalt | — | 0.24 |
| Manosec Calcium | — | 1.43 |
| Catafor CA80 | — | 3.00 |
| Perenol F40 | 0.67 | — |
| Dibutyl Phthalate | 2.90 | — |
| Byk P104S | 0.37 | — |
| methyl Ethyl Ketoxime | — | 0.28 |
| Troysol 98-C | — | 0.57 |
| | 100.00 | 100.00 |

TABLE 2

| RAW MATERIAL DESCRIPTIONS | |
|---|---|
| RAW MATERIAL | PRODUCT DESCRIPTION |
| Unithane 638W* | Resin |
| DHX 30-50* | Resin |
| Synolac 9285X* | Resin |
| Neocryl B722* | Resin |
| Neocryl B735* | Resin |
| Paraloid B48N* | Resin |
| Plastyrol AC251* | Resin |
| Wresinol VAS 9142* | Resin |
| Acetone | Solvent |
| Diacetone alcohol | Solvent |
| Ethylene glycol monobutyl ether | Solvent |
| Xylene | Solvent |
| Toluene | Solvent |
| Ethyl 3-ethoxy propionate | Solvent |
| Methyl ethyl ketone | Solvent |
| Butyl alcohol | Solvent |
| Titanium dioxide | Pigment |
| Microlith Blue* | Pigment |
| Carbon black | Pigment |
| Tryl Red* | Pigment |
| Quinacridone Pink* | Pigment |
| Zirconium drier | Drier |
| Manosec Cobalt* | Drier |
| Manosec Calcium* | Drier |
| Byk ES 80* | Conductivity Additive |

TABLE 2-continued

| RAW MATERIAL DESCRIPTIONS | |
|---|---|
| RAW MATERIAL | PRODUCT DESCRIPTION |
| Catafor CA80* | Conductivity Additive |
| Perenol F 40* | Conductivity Additive |
| Dibutyl phthalate | Plasticiser |
| Byk P104S* | Dispersion Additive |
| Nuosperse* | Dispersion Additive |
| Bentone SD2* | Rheology Modifier |
| Methyl ethyl ketoxime | Anti Skinning Agent |
| Elvacite 2013* | Resin |
| Soalkyd 3007* | Resin |
| Troysol 98-C* | Dispersion/Wetting Additive |
| Magnacryl PX 1264* | Pigment |
| Magnacryl PX 1275* | Pigment |

NB* Denotes Trade Marks

TABLE 3A

ELECTRODYN PAINT SYSTEMS- PERFORMANCE DATA

| PAINT SYSTEM | NITROCELLULOSE | NITROCELLULOSE | POLYURETHANE | POLYURETHANE | ACRYLIC |
|---|---|---|---|---|---|
| CODE NUMBER | AP10/M/96 | AP10/N/1/44 | AP10/K/97 | AP10/J/26 | AP10/J/5 |
| SPRAY RATE (mil/min) | 1<br>2<br>3<br>6 | 1<br>2<br>3<br>6 | 1<br>2<br>3<br>6 | 1<br>2<br>3<br>6 | 1<br>2<br>3<br>6 |
| RESISTIVITY ($\times 10^6$ ohm cm) | 8.19 | 0.95 | 5.72 | 12.56 | 4.76 |
| VISCOSITY (Poise) | 1.75 | 3.23 | 1.59 | 0.34 | 0.96 |
| NON-VOLATILE CONTENT (%) | 16.48 | 21.02 | 56.95 | 52.47 | 29.45 |
| GLOSS*' (ASTM D523, 60 angle) At spray rate | 91.40<br>92.60<br>93.40<br>92.00 | 76.20<br>75.40<br>74.40<br>— | 89.70<br>89.80<br>90.80<br>91.40 | 94.70<br>95.20<br>95.50<br>— | 81.60<br>81.60<br>80.80<br>— |
| COVERING POWER*' ($\times 10^5$ g/s/cm$^2$) At spray rate | 1.98<br>3.58<br>5.31<br>9.93 | 1.13<br>3.53<br>5.02<br>— | 5.79<br>9.96<br>15.69<br>28.71 | 4.61<br>7.16<br>10.40<br>— | 2.73<br>4.68<br>7.20<br>— |

*At the different spray rates

TABLE 3b

ELECTRODYN PAINT SYSTEMS - PERFORMANCE DATA

| PAINT SYSTEM | ACRYLIC | ALKYD | ALKYD | ACRYLIC | ALKYD |
|---|---|---|---|---|---|
| CODE NUMBER | AP10/M/99 | AP10/N/70a | AP10/K/12i | AP10/LV2 | AP10/HS4 |
| SPRAY RATE (mil/min) | 1<br>2<br>3<br>6 | 1<br>2<br>3<br>6 | 1<br>2<br>3<br>6 | 2<br>3<br>4 | 2 12<br>4<br>6 15 |
| RESISTIVITY ($\times 10^6$ ohm cm) | 1.07 | 5.90 | 2.29 | 3.11 | 2.53 |
| VISCOSITY (Poise) | 1.60 | 5.15 | 3.30 | 0.163 | 3.40 |
| NON-VOLATILE CONTENT (%) | 32.67 | 70.96 | 57.66 | 22 | 86 |
| Gross*' (ASTM D523, 60 angle) At spray rate | 86.10<br>85.70<br>85.40<br>84.50 | 90.40<br>91.60<br>92.10<br>92.20 | 95.40<br>93.90<br>94.20<br>95.90 | 84.7<br>85.7<br>84.7 | 91.5 90.5<br>93.2<br>91.6 92.3<br>91.6 92.3 |
| COVERING POWER ($\times 10^6$ g/s/cm$^2$) At spray rate | 4.14<br>6.89<br>10.37<br>19.72 | 7.91<br>10.29<br>13.43<br>21.62 | 4.66<br>8.91<br>13.85<br>22.78 | 3.33<br>4.95<br>5.54 | 13.2 39.3<br>17.9<br>25.0 48.8 |

*At the different spray rates

We claim:

1. A paint formulation of pigment, resin and solvent, for electrostatic spraying, based on one of the following resins and having a film-forming solids content, according to the base resin, as follows:

| Resin | Formulation Solids (by weight) |
|---|---|
| alkyd | 55% to 90% |
| acrylic | 20% to 40% |

-continued

| Resin | Formulation Solids (by weight) |
|---|---|
| nitrocellulose | 17.5% to 25% |
| polyurethane | 50% to 70% | together with viscosity/resistivity values which in a rectangular plot of resistivity (ohm cm×$10^6$) and viscosity (P) fall within the rectilinear-sided operating envelope defined by the points x/y 0.25×$10^6$/0.1, 2×$10^6$/8, 32×$10^6$/4 and 35×$10^6$/0.1.

2. The formulation of claim 1 with the following relation of the resins and the solids content:

| | |
|---|---|
| alkyd | 55 to 75% |
| acrylic | 25 to 35% |
| nitrocellulose | 17.5 to 22.5% |
| polyurethane | 50 to 60% |

3. The formulation of claim 1 when for use in electrostatic spraying, at from 1 to 15 ml/min, and with resulting gloss of over 70, as defined by ASTM D523,60°.

4. The formulation as claimed in claim 3 wherein the application rate is 1.5 to 10 $g/s/cm^2 \times 10^{-5}$ dry paint film.

5. A method of spray painting wherein electrostatic spraying is employed and a paint formulation as set out in claim 1 is used.

6. The formulation of claim 1 wherein the viscosity/resistivity values fall within a rectilinear-sided operating envelope defined by the points x/y $0.25 \times 10^6/0.25$, $2 \times 10^6/8$, $32 \times 10^6/0.25$ and $35 \times 10^6/0.25$.

7. A formulation as claimed in claim 4 wherein the application rate is 1.7 to 8.4 $g/s/cm^2 \times 10^{-5}$ dry paint film.

8. A method of spray painting comprising the steps of forming a spray cloud by the application of a high electric potential to a liquid paint formulation at a paint-supply head thereby breaking said paint up into charged droplets by electrostatic forces, and spraying the charged droplets whereby the droplets are attracted to a work to be painted to form a film, the liquid paint formulation having a film-forming solids content by weight, according to the resin system, selected from:

| | |
|---|---|
| alkyd | 55% to 90% |
| acrylic | 20% to 40% |
| nitrocellulose | 17.5% to 25% |
| polyurethane | 50% to 70% | and viscosity/resistivity values which in a rectangular plot of resistivity (ohm cm$\times 10^6$) and viscosity (P) fall within the rectilinear-sided operating envelope defined by the points x/y $0.25 \times 10^6/0.1$, $2 \times 10^6/8$, $32 \times 10^6/4$ and $35 \times 10^6/0.1$.

9. The method of claim 8 wherein the film-forming solid contents are:

| | |
|---|---|
| alkyd | 55% to 75% |
| acrylic | 20% to 35% |
| nitrocellulose | 17.5% to 22.5% |
| polyurethane | 50% to 60%. |

10. The method of claim 8 wherein the liquid paint formulation has x/y viscosity/resistivity values of $0.25 \times 10^6/0.25$, $2 \times 10^6/8$, $32 \times 10^6/4$ and $35 \times 10^6/0.25$.

11. The method of claim 8 wherein the spraying step is carried out at from 1 to 15 ml/min, resulting in a dry paint film gloss of over 70 as defined by ASTM D523,60.

12. The method of claim 11 wherein the spraying step is carried out at from 1 to 6 ml/min and the gloss of the resultant dry paint film is over 80.

13. The method of claim 8 wherein the application rate is 1.5 to 10 $g/s/cm^2 \times 10^{-5}$ dry paint film.

14. The method of claim 13 wherein the application rate is 1.7 to 8.4 $g/s/cm^2 \times 10^{-5}$ dry paint film.

15. An electrostatically sprayable paint formulation of pigment, resin and solvent based on one of the following resins and having a film-forming solids content, according to the base resin, as follows:

| Resin | Formulation Solids (by weight) |
|---|---|
| alkyd | 55% to 90% |
| acrylic | 20% to 40% |
| nitrocellulose | 17.5% ot 25% |
| polyurethane | 50% to 70% | together with viscosity/resistivity values which in a rectangular plot of resistivity (ohm cm$\times 10^6$) and viscosity (P) fall within the rectilinear-sided operating envelope defined by the points x/y $0.25 \times 10^6/0.1$, $2 \times 10^6/8$, $32 \times 10^6/4$ and $35 \times 10^6/0.1$.

16. The electrically sprayable formulation of claim 15 with the following relation of the resins and the solids content:

| | |
|---|---|
| alkyd | 55% to 75% |
| acrylic | 20% to 35% |
| nitrocellulose | 17.5% to 22.5% |
| polyurethane | 50% to 60%. |

17. The electrically sprayable formulation of claim 15 for use in electrostatic spraying, at from 1 to 15 ml/min, and with resulting gloss of over 70 as defined by ASTM D523, 60°.

18. The electrically sprayable formulation as claimed in claim 11 wherein the application rate is 1.5 to 10 $g/s/cm^2 \times 10^{-5}$ dry paint film.

19. The electrically sprayable formulation as claimed in claim 15 wherein the viscosity/resistivity values fall within a rectilinear-sided operated envelope defined by the points x/y viscosity/resistivity values of $0.25 \times 10^6/0.25$, $2 \times 10^6/8$, $32 \times 10^6/4$ and $35 \times 10^6/0.25$.

20. A formulation as claimed in claim 18 wherein the application rate is 1.7 to 8.4 $g/s/cm^2 \times 10^{-5}$ dry paint film.

* * * * *